(12) United States Patent
Yamaguchi

(10) Patent No.: US 8,830,651 B2
(45) Date of Patent: Sep. 9, 2014

(54) LAMINATED CERAMIC CAPACITOR AND PRODUCING METHOD FOR LAMINATED CERAMIC CAPACITOR

(71) Applicant: Murata Manufacturing Co., Ltd., Nagaokakyo (JP)

(72) Inventor: Shinichi Yamaguchi, Kyoto-Fu (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

(21) Appl. No.: 14/058,960

(22) Filed: Oct. 21, 2013

(65) Prior Publication Data
US 2014/0078642 A1    Mar. 20, 2014

Related U.S. Application Data

(63) Continuation of application No. PCT/JP2012/067285, filed on Jul. 6, 2012.

(30) Foreign Application Priority Data

Aug. 23, 2011 (JP) ................. 2011-181060

(51) Int. Cl.
| | |
|---|---|
| *H01G 4/30* | (2006.01) |
| *C04B 35/468* | (2006.01) |
| *H01G 4/12* | (2006.01) |
| *C04B 35/626* | (2006.01) |
| *H01B 3/12* | (2006.01) |
| *H01G 4/018* | (2006.01) |

(52) U.S. Cl.
CPC ........ *H01G 4/018* (2013.01); *C04B 2235/6584* (2013.01); *C04B 2235/3224* (2013.01); *C04B 2235/3239* (2013.01); *C04B 2235/3225* (2013.01); *C04B 35/4682* (2013.01); *H01G 4/1227* (2013.01); *C04B 2235/3244* (2013.01); *C04B 2235/3232* (2013.01); *C04B 2235/3206* (2013.01); *C04B 2235/3227* (2013.01); *C04B 35/62675* (2013.01); *C04B 2235/768* (2013.01); *C04B 2235/3418* (2013.01); *C04B 2235/5445* (2013.01); *C04B 2235/3208* (2013.01); *H01B 3/12* (2013.01); *C04B 2235/3215* (2013.01); *H01G 4/30* (2013.01); *C04B 2235/3262* (2013.01); *C04B 2235/85* (2013.01)
USPC .................. 361/301.4; 361/301.2; 361/306.1; 361/306.3; 361/321.1; 361/321.2

(58) Field of Classification Search
USPC ................ 361/301.4, 301.2, 303–305, 306.1, 361/311–313, 321.1; 501/134, 135, 136, 501/137, 138, 139
See application file for complete search history.

(56) References Cited

U.S. PATENT DOCUMENTS

| | | | |
|---|---|---|---|
| 6,243,254 B1 | 6/2001 | Wada et al. | |
| 7,397,649 B2 * | 7/2008 | Muto et al. ................. | 361/321.4 |
| 8,358,494 B2 * | 1/2013 | Nishimura et al. ......... | 361/321.2 |
| 8,383,535 B2 * | 2/2013 | Yamaguchi ................ | 501/138 |
| 8,385,049 B2 * | 2/2013 | Inoue et al. ................ | 361/321.4 |
| 8,592,335 B2 * | 11/2013 | Okamoto et al. ............ | 501/139 |
| 8,673,798 B2 * | 3/2014 | Nakamura ................... | 501/137 |
| 2007/0123413 A1 | 5/2007 | Suzuki | |

FOREIGN PATENT DOCUMENTS

| | | |
|---|---|---|
| JP | 2000-58377 | 2/2000 |
| JP | 2007145649 A | 6/2007 |
| WO | WO-2006/006333 A1 | 1/2006 |
| WO | WO-2011/024582 A1 | 3/2011 |

OTHER PUBLICATIONS

PCT/JP2012/067285, International Search Report date of mailing Oct. 9, 2012.
PCT/JP2012/067285, Written Opinion of the International Searching Authority, date of mailing Sep. 10, 2012.

* cited by examiner

Primary Examiner — Nguyen T Ha
(74) Attorney, Agent, or Firm — Dickstein Shapiro LLP

(57) ABSTRACT

A laminated ceramic capacitor having high electrostatic capacitance and excellent lifetime characteristics, even when in a high electric field intensity employs a dielectric ceramic including crystal grains and crystal grain boundaries which contains, as its main constituent, a perovskite-type compound including Ba, Ca, and Ti, and further contains Mg, R (Y, La, Sm, Eu, Gd, Tb, Dy, Ho, Er, Tm, and/or Yb), and Zr, such that when the laminated body is dissolved, the contents in terms of parts by mol are Ca: 3 to 15 parts by mol, Mg: 0.01 to 0.09 parts by mol, R: 2.5 to 8.4 parts by mol, and Zr: 0.05 to 3.0 parts by mol with respect to 100 parts by mol of Ti, and there is Ca at least at the centers of the crystal grains.

17 Claims, 1 Drawing Sheet

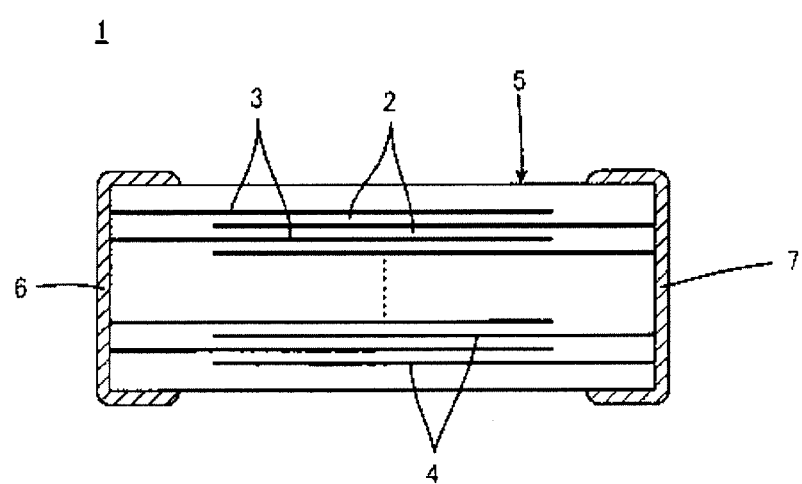

LAMINATED CERAMIC CAPACITOR AND PRODUCING METHOD FOR LAMINATED CERAMIC CAPACITOR

This is a continuation of application Serial Number PCT/JP2012/067285, filed Jul. 6, 2012, the entire contents of which are incorporated herein by reference.

TECHNICAL FIELD

The present invention relates to a dielectric ceramic and a laminated ceramic capacitor, and particularly, relates to a dielectric ceramic which is suitable for reduction in size and increase in capacitance in laminated ceramic capacitors, and a laminated ceramic capacitor configured with the use of the dielectric ceramic.

BACKGROUND ART

With the progress of recent electronics technology, a reduction in size and increase in capacitance have been required for laminated ceramic capacitors. In order to satisfy these requirements, a reduction in layer thickness has been advanced for dielectric layers of laminated ceramic capacitors. However, the reduction of the dielectric layers in layer thickness increases the electric field intensity applied per layer. Therefore, improvements in reliability in the case of applying a voltage, in particular, improvements in lifetime characteristics in a high-temperature loading test have been required for the dielectric ceramic used in the dielectric layers.

For example, Patent Document 1 discloses a dielectric ceramic having a perovskite-type crystal structure containing barium titanate as its main constituent and containing a rare-earth element, magnesium, and manganese as accessory constituents, which is represented by the composition formula $(Ba_{1-y}RE_y)(Ti_{1-a-b}Mg_{ao}Mn_b)O_3$ (RE: rare-earth element), where the respective ranges are $0.06 \leq y \leq 0.09$, $0.03 \leq ao \leq 0.045$, and $0.012 \leq b \leq 0.018$.

PRIOR ART DOCUMENTS

Patent Documents

Patent Document 1: Japanese Patent Application Laid-Open No. 2007-145649

DISCLOSURE OF THE INVENTION

Problem to be Solved by the Invention

In order to achieve a higher dielectric constant, there is a need to adequately grow the crystal grains of a dielectric ceramic. However, when dielectric ceramic layers are reduced in thickness to on the order of 1 μm, an electric field intensity (for example, 30 kV/mm or more) is applied which is higher than before. Patent Document 1 has, in this case, a problem that the electric field is more likely to be locally concentrated and causes deficient lifetime characteristics, probably because the number of crystal grains per dielectric ceramic layer is decreased.

Therefore, an object of the present invention is to provide a dielectric ceramic which can solve the problem as described above, a method for producing the dielectric ceramic, and furthermore, a laminated ceramic capacitor configured with the use of the dielectric ceramic.

Means for Solving the Problem

The present invention provides a laminated ceramic capacitor including: a laminated body that has dielectric ceramic layers including crystal grains and crystal grain boundaries, and has internal electrode layers; and external electrodes formed on a surface of the laminated body for electrically connecting to the internal electrode layers exposed at the surface of the laminated body, wherein the laminated body has a composition containing, as its main constituent, a perovskite-type compound including Ba, Ca, and Ti, and further containing Mg, R (R is at least one selected from Y, La, Sm, Eu, Gd, Tb, Dy, Ho, Er, Tm, and Yb), and Zr, and when the laminated body is dissolved, the contents of the respective elements in terms of parts by mol are Ca: 3 parts by mol or more and 15 parts by mol or less, Mg: 0.01 parts by mol or more and 0.09 parts by mol or less, R: 2.5 parts by mol or more and 8.4 parts by mol or less, and Zr: 0.05 parts by mol or more and 3.0 parts by mol or less with respect to 100 parts by mol of Ti, and there is Ca at least at the centers of the crystal grains.

In addition, the present invention provides a laminated ceramic capacitor including: a laminated body that has dielectric ceramic layers including crystal grains and crystal grain boundaries, and has internal electrode layers; and external electrodes formed on a surface of the laminated body for electrically connecting the internal electrode layers exposed at the surface of the laminated body, wherein the dielectric ceramic layers has a composition containing, as its main constituent, a perovskite-type compound including Ba, Ca, and Ti, and further containing Mg, R (R is at least one selected from Y, La, Sm, Eu, Gd, Tb, Dy, Ho, Er, Tm, and Yb), and Zr, the contents of the respective elements in terms of parts by mol are Ca: 3 parts by mol or more and 15 parts by mol or less, Mg: 0.01 parts by mol or more and 0.09 parts by mol or less, R: 2.5 parts by mol or more and 8.4 parts by mol or less, and Zr: 0.05 parts by mol or more and 3.0 parts by mol or less with respect to 100 parts by mol of Ti, and there is Ca at least at the centers of the crystal grains.

In addition, the R content is preferably 5.7 parts by mol or more and 8.4 parts by mol or less with respect to 100 parts by mol of Ti in the laminated ceramic capacitor according to the present invention.

The laminated ceramic capacitor according to the present invention may further contain Mn, V, and Si, and the contents of the respective elements in terms of parts by mol are Mn: 0.1 parts by mol or more and 1.0 part by mol or less, V: 0.05 parts by mol or more and 0.5 parts by mol or less, and Si: 0.5 parts by mol or more and 2.5 parts by mol or less with respect to 100 parts by mol of Ti.

Furthermore, the present invention is also directed to a method for producing the laminated ceramic capacitor.

That is, provided is a method for producing a laminated ceramic capacitor, which includes the steps of: preparing a main constituent powder containing, as its main constituent, a perovskite-type compound including Ba, Ca, and Ti; preparing a Mg compound, an R (R is at least one selected from Y, La, Sm, Eu, Gd, Tb, Dy, Ho, Er, Tm, and Yb) compound, and a Zr compound; mixing the main constituent powder, the Mg compound, the R compound, and the Zr compound, and then obtaining ceramic slurry; obtaining ceramic green sheets from the ceramic slurry; stacking the ceramic green sheets and internal electrode layers to obtain an unfired laminated body; and firing the unfired laminated body to obtain a laminated body, wherein the contents of the respective elements in terms of parts by mol are Ca: 3 parts by mol or more and 15 parts by mol or less, Mg: 0.01 parts by mol or more and 0.09 parts by mol or less, R: 2.5 parts by mol or more and 8.4 parts by mol or less, and Zr: 0.05 parts by mol or more and 3.0 parts by mol or less with respect to 100 parts by mol of Ti.

Advantageous Effects of the Invention

The laminated ceramic capacitor according to the present invention can achieve a relatively high dielectric constant without significantly increasing the crystal grains in size. In addition, the crystal grains are kept in size at a certain level, and the lifetime characteristics of the laminated ceramic capacitor are thus less likely to be degraded, even when the dielectric ceramic layers are reduced in thickness. Although the mechanism is not known exactly, it is presumed that with the composition as mentioned above, the compressive stress applied to each of the crystal grains is lowered to reduce the decrease in dielectric constant.

Thus, the laminated ceramic capacitor according to the present invention has a large value of "Dielectric Constant/ Crystal Grain Size", and thus can achieve a laminated ceramic capacitor which is extremely small in size and high in capacitance, and excellent in terms of lifetime characteristics.

BRIEF EXPLANATION OF DRAWINGS

FIG. 1 is a cross-sectional view schematically illustrating a laminated ceramic capacitor 1 configured with the use of a dielectric ceramic according to the present invention.

MODE FOR CARRYING OUT THE INVENTION

With reference to FIG. 1, an example of a laminated ceramic capacitor 1 will be first described to which a dielectric ceramic according to the present invention is applied.

The laminated ceramic capacitor 1 includes a laminated body 5 configured with the use of a stacked plurality of dielectric ceramic layers 2 and a plurality of internal electrodes 3 and 4 formed along the interfaces between the dielectric ceramic layers 2. The internal electrodes 3 and 4 contain, for example, Ni, as their main constituent.

First and second external electrodes 6 and 7 are formed in different positions from each other on the outer surface of the laminated body 5. The external electrodes 6 and 7 contain, for example, Ag or Cu as their main constituent. Although not shown, a plating film is formed on the external electrodes 6 and 7, if necessary. The plating film includes, for example, a Ni plating film and a Sn plating film formed thereon.

In the case of the laminated ceramic capacitor 1 shown in FIG. 1, the first and second external electrodes 6 and 7 are formed on the respective end surfaces of the capacitor main body 5, which are opposed to each other. The internal electrodes 3 and 4 include a plurality of first internal electrodes 3 electrically connected to the first external electrode 6 and a plurality of second internal electrodes 4 electrically connected to the second external electrode 7, and these first and second internal electrodes 3 and 4 are arranged alternately in the stacking direction.

It is to be noted that the laminated ceramic capacitor 1 may be a two-terminal capacitor including two external electrodes 6 and 7, or may be a multi-terminal capacitor including a larger number of external electrodes.

In this laminated ceramic capacitor 1, the dielectric ceramic layers 2 including crystal grains and crystal grain boundaries occupy a large portion of the laminated body 5, and the dielectric ceramic layers basically have an oxide ceramic.

The composition of the laminated body 5, preferably the composition of the dielectric ceramic layers 2 contains, as its main constituent, a perovskite-type compound containing Ba, Ca, and Ti, and further contains Mg, R (R is at least one selected from Y, La, Sm, Eu, Gd, Tb, Dy, Ho, Er, Tm, and Yb), and Zr.

The main constituent is a so-called barium titanate based perovskite-type compound. That is, most of the crystal grains mainly contain barium calcium titanate. However, the location of Ca present in the perovskite structure is not to be considered limited to the Ba site, and some of Ca may be present at the Ti site. It is to be noted that the molar ratio of (Ba, Ca)/Ti has a number close to 1 in this case, but may deviate from 1 without interfering with the object of the present invention.

It can be confirmed by a method such as, for example, XRD that the main constituent of the laminated body 5, or the main constituent of the dielectric ceramic layers 2 is a perovskite-type compound. While the content ratio of Ca is low as compared with Ba and Ti, barium calcium titanate can be regarded as the main constituent as long as it can be confirmed by a method such as EPMA that there is even a slight amount of Ca in central regions of the crystal grains.

In addition, the composition of the laminated body 5, or the composition of the dielectric ceramic layers 2 may contain Mg, R, and Zr as accessory constituents. These accessory constituents may be present in any form. For example, the accessory constituents may be present as oxides such as MgO at crystal grain boundaries or triple points, or may form secondary-phase grains as composite oxides containing multiple types of elements. In addition, the accessory constituents may be partially present in the crystal grains. In particular, the accessory constituents may be present only in surface layer sections (shell sections) of the crystal grains.

It is to be noted that as for the content ratios of the respective elements in the composition of the laminated body 5, quantitative analysis can be conducted by, for example, ICP (emission spectroscopic plasma analysis method) with the laminated body dissolved. In essence, it is preferable to define the composition of only the dielectric ceramic layers 2. However, a large portion of the laminated body 5 is occupied by the electrostatic capacitance forming section of the dielectric ceramic layers 2 as described above, and it is thus only necessary to define the composition of the laminated body 5.

As for the contents of the respective elements, with respect to 100 parts by mol of Ti, Ca is 3 parts by mol or more and 15 parts by mol or less, Mg is 0.01 parts by mol or more and 0.09 parts by mol or less, R is 2.5 parts by mol or more and 8.4 parts by mol or less, and Zr is 0.05 parts by mol or more and 3.0 parts by mol or less. In this case, the synergistic interaction of Mg, R and Zr with Ca in the crystal grains increases the value of Dielectric Constant/Crystal Grain Size, and makes the lifetime characteristics favorable.

Preferably, the content of R is 5.7 parts by mol or more and 8.4 parts by mol or less with respect to 100 parts by mol of Ti. In this case, the value of Dielectric Constant/Crystal Grain Size is further increased, and the lifetime characteristics are further made favorable.

In addition, it is also preferable to contain Mn, V, and Si as further accessory constituents. With respect to 100 parts by mol of Ti, the content of Mn is 0.1 parts by mol or more and 1 part by mol or less, the content of V is 0.05 parts by mol or more and 0.5 parts by mol or less, and the content of Si is 0.5 parts by mol or more and 2.5 parts by mol or less. In this case, the laminated ceramic capacitor achieves high insulation properties and favorable temperature characteristics of electrostatic capacitance.

The forms of Mn, V, and Si present in the dielectric ceramic layers are also not to be considered particularly limited. For example, the accessory constituents may be present as oxides such as MnO at crystal grain boundaries, or may form secondary-phase grains as composite oxides containing multiple types of elements. In addition, the accessory constituents may be partially present in the crystal grains. In particular, the accessory constituents may be present only in surface layer sections (shell sections) of the crystal grains.

Next, a method for producing the laminated ceramic capacitor will be described below.

First, prepared is a main constituent powder containing, as its main constituent, a perovskite-type compound containing at least Ba, Ca, and Ti. For example, a method is conceivable in which a Ba compound, a Ti compound, and a Ca compound are mixed to synthesize barium calcium titanate. One example is a solid-phase synthesis method, that is, a method in which a $BaCO_3$ powder, a $CaCO_3$ powder, and a $TiO_2$ powder are mixed and subjected to a heat treatment. Other preferred methods also include: a method in which a solution containing Ba and Ca is added to $TiO_2$ microparticles to synthesize barium calcium titanate in the solution; and wet synthesis methods such as a hydrothermal synthesis method, a hydrolysis method, and an oxalic acid method. Further, a method is also conceivable in which a highly reactive $BaTiO_3$ powder and a Ca compound are mixed, and adequately subjected to a heat treatment to obtain a barium calcium titanate powder.

Next, prepared are a Mg compound, an R (R is at least one selected from Y, La, Sm, Eu, Gd, Tb, Dy, Ho, Er, Tm, and Yb) compound, and a Zr compound to serve as accessory constituents. The forms of these compounds are not to be considered particularly limited, which may be oxide powders or carbonate powders, or may be sol or organometallic.

Then, the main constituent powder, the Mg compound, the R compound, and the Zr compound are mixed. In this case, other elements may be incorporated as accessory constituents. In addition, the mixed form of the accessory constituents is not to be considered particularly limited. For example, multiple types of accessory constituents may be mixed in advance, or further subjected to a heat treatment for synthesis. In addition, a specific accessory constituent may be added in two or more stages. Furthermore, the accessory constituents may be partially mixed in advance during the synthesis of the main constituent, without interfering with the object of the present invention.

The ceramic slurry obtained when the accessory constituents are mixed in the main constituent powder and mixed with a binder or the like is subjected to sheet forming. Alternatively, the main constituent powder with the accessory constituents added thereto may be then dried to obtain a ceramic raw material, which may be thereafter mixed again with a solvent to obtain ceramic slurry. If necessary, the ceramic raw material powder may be subjected to a heat treatment to react the main constituent powder with the accessory constituents.

Next, this ceramic slurry is subjected to sheet forming to obtain ceramic green sheets. The ceramic green sheets and internal electrode layers are stacked to obtain an unfired laminated body. Specifically, there is a method in which a conductive paste including metal particles to serve as an internal electrode constituent and an organic vehicle is formed by application onto the surfaces of the ceramic green sheets, and these ceramic green sheets are stacked so as to alternate the directions in which edges of the internal electrodes extend, and subjected to pressure bonding.

The raw laminated body obtained, from which the binder is removed, is then subjected to firing under an atmosphere having an oxygen partial pressure that does not oxidize the internal electrodes or not reduce the dielectric. This firing provides a laminated body 5 including the dielectric ceramic 2 including crystal grains and crystal grain boundaries; and the internal electrodes 3, 4.

The laminated ceramic capacitor 1 is obtained by forming external electrodes on sections of the laminated body 5 at which the internal electrode layers are exposed. It is to be noted that the formation of the external electrodes also includes a method in which a conductive paste is formed in advance by application onto the surface of the unfired laminated body, and baked in accordance with the firing for the laminated body.

EXAMPLES

Experimental examples will be described below, which were carried out in accordance with the present invention.

Example 1

(A) Preparation of Ceramic Raw Material

First, respective powders of high-purity $BaCO_3$, $CaCO_3$, and $TiO_2$ were prepared as starting raw materials of $(Ba_{1-x}Ca_x)TiO_3$ to serve as the main constituent, and blended so as to have the contents shown in Table 1, that is, the "Ca Content: x".

Next, this blended powder was subjected to wet mixing in a ball mill so as to be dispersed uniformly, and then subjected to drying to obtain an adjusted powder. Then, the adjusted powder obtained was subjected to calcination at a temperature of 1000° C. to 1200° C. to obtain a main constituent powder with an average grain size of 0.2 μm.

On the other hand, respective powders of $MgCO_3$, $R_2O_3$, and $ZrO_2$ were prepared as accessory constituents. It is to be noted that respective powders of $Y_2O_3$, $La_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, and $Yb_2O_3$ were prepared for the $R_2O_3$ powder.

Next, the respective powders of $MgCO_3$, $R_2O_3$, and $ZrO_2$ were weighed so as to provide the contents of Mg, R, and Zr in terms of parts by mol with respect to 100 parts by mol of Ti as shown in Table 1, and added to the above-described main constituent powder to obtain a mixed powder.

TABLE 1

| Sample Number | x | Mg | Type of R | R Content | Zr Content |
|---|---|---|---|---|---|
| 1 | 0.08 | 0.05 | Dy | 7.0 | 0.5 |
| 2 | 0.08 | 0.005 | Dy | 7.0 | 0.5 |
| 3 | 0.08 | 0.01 | Dy | 7.0 | 0.5 |
| 4 | 0.08 | 0.09 | Dy | 7.0 | 0.5 |
| 5 | 0.08 | 0.13 | Dy | 7.0 | 0.5 |
| 6 | 0.08 | 0.05 | Dy | 2.0 | 0.5 |
| 7 | 0.08 | 0.05 | Dy | 2.5 | 0.5 |
| 8 | 0.08 | 0.05 | Dy | 5.0 | 0.5 |
| 9 | 0.08 | 0.05 | Dy | 5.7 | 0.5 |
| 10 | 0.08 | 0.05 | Dy | 8.4 | 0.5 |
| 11 | 0.08 | 0.05 | Dy | 8.6 | 0.5 |
| 12 | 0.08 | 0.05 | Dy | 7.0 | 0 |
| 13 | 0.08 | 0.05 | Dy | 7.0 | 0.05 |
| 14 | 0.08 | 0.05 | Dy | 7.0 | 2.9 |
| 15 | 0.08 | 0.05 | Dy | 7.0 | 3.2 |
| 16 | 0.02 | 0.05 | Dy | 7.0 | 0.5 |
| 17 | 0.03 | 0.05 | Dy | 7.0 | 0.5 |
| 18 | 0.15 | 0.05 | Dy | 7.0 | 0.5 |
| 19 | 0.16 | 0.05 | Dy | 7.0 | 0.5 |
| 20 | 0.08 | 0.05 | Y | 2.5 | 0.5 |
| 21 | 0.08 | 0.05 | Y | 5.7 | 0.5 |
| 22 | 0.08 | 0.05 | Y | 7.0 | 0.5 |

TABLE 1-continued

| Sample Number | x | Mg | Type of R | R Content | Zr Content |
|---|---|---|---|---|---|
| 23 | 0.08 | 0.05 | Y | 8.4 | 0.5 |
| 24 | 0.08 | 0.05 | La | 2.5 | 0.5 |
| 25 | 0.08 | 0.05 | La | 5.7 | 0.5 |
| 26 | 0.08 | 0.05 | La | 7.0 | 0.5 |
| 27 | 0.08 | 0.05 | La | 8.4 | 0.5 |
| 28 | 0.08 | 0.05 | Sm | 2.5 | 0.5 |
| 29 | 0.08 | 0.05 | Sm | 5.7 | 0.5 |
| 30 | 0.08 | 0.05 | Sm | 7.0 | 0.5 |
| 31 | 0.08 | 0.05 | Sm | 8.4 | 0.5 |
| 32 | 0.08 | 0.05 | Eu | 2.5 | 0.5 |
| 33 | 0.08 | 0.05 | Eu | 5.7 | 0.5 |
| 34 | 0.08 | 0.05 | Eu | 7.0 | 0.5 |
| 35 | 0.08 | 0.05 | Eu | 8.4 | 0.5 |
| 36 | 0.08 | 0.05 | Gd | 2.5 | 0.5 |
| 37 | 0.08 | 0.05 | Gd | 5.7 | 0.5 |
| 38 | 0.08 | 0.05 | Gd | 7.0 | 0.5 |
| 39 | 0.08 | 0.05 | Gd | 8.4 | 0.5 |
| 40 | 0.08 | 0.05 | Tb | 2.5 | 0.5 |
| 41 | 0.08 | 0.05 | Tb | 5.7 | 0.5 |
| 42 | 0.08 | 0.05 | Tb | 7.0 | 0.5 |
| 43 | 0.08 | 0.05 | Tb | 8.4 | 0.5 |
| 44 | 0.08 | 0.05 | Hb | 2.5 | 0.5 |
| 45 | 0.08 | 0.05 | Hb | 5.7 | 0.5 |
| 46 | 0.08 | 0.05 | Hb | 7.0 | 0.5 |
| 47 | 0.08 | 0.05 | Hb | 8.4 | 0.5 |
| 48 | 0.08 | 0.05 | Er | 2.5 | 0.5 |
| 49 | 0.08 | 0.05 | Er | 5.7 | 0.5 |
| 50 | 0.08 | 0.05 | Er | 7.0 | 0.5 |
| 51 | 0.08 | 0.05 | Er | 8.4 | 0.5 |
| 52 | 0.08 | 0.05 | Tm | 2.5 | 0.5 |
| 53 | 0.08 | 0.05 | Tm | 5.7 | 0.5 |
| 54 | 0.08 | 0.05 | Tm | 7.0 | 0.5 |
| 55 | 0.08 | 0.05 | Tm | 8.4 | 0.5 |
| 56 | 0.08 | 0.05 | Yb | 2.5 | 0.5 |
| 57 | 0.08 | 0.05 | Yb | 5.7 | 0.5 |
| 58 | 0.08 | 0.05 | Yb | 7.0 | 0.5 |
| 59 | 0.08 | 0.05 | Yb | 8.4 | 0.5 |

(B) Preparation of Laminated Ceramic Capacitor

The mixed powder with an organic solvent and a dispersant added thereto was subjected to wet mixing in a ball mill for homogeneous dispersion. Further mixing was carried out with the addition of a polyvinyl butyral based binder and a plasticizer to obtain ceramic slurry.

Then, this ceramic slurry was subjected to sheet forming in accordance with a lip method to obtain ceramic green sheets in a rectangular shape with a thickness of 1.3 μm.

A ceramic green sheet was sampled, and subjected to composition analysis on the inorganic constituents by ICP to confirm that the blending composition shown in Table 1 was kept substantially. It is to be noted that the incorporation from the YSZ balls used for the mixing increased the content of Zr by a minute amount on the order of 0.03 parts by mol.

Next, a conductive paste containing Ni was applied by screen printing onto the ceramic green sheets, thereby forming conductive paste films to serve as internal electrodes.

Multiple ceramic green sheets with the conductive paste films formed were stacked so as to alternate the edges to which the conductive paste films extended, thereby providing a raw laminated body to serve as a capacitor main body.

The laminated body was heated at a temperature of 350° C. for 3 hours in an $N_2$ atmosphere to burn off the binder, and then subjected to firing at 1200° C. for 2 hours in a reducing atmosphere including a $H_2$—$N_2$—$H_2O$ gas with an oxygen partial pressure $10^{-9}$ to $10^{-12}$ MPa to obtain a sintered laminated body.

The laminated body was dissolved, and subjected to an ICP analysis to confirm that the composition of the ceramic green sheet had been substantially maintained, except for Ni as an internal electrode constituent.

Next, the laminated body was subjected to an XRD structural analysis to reveal that the main constituent had a barium titanate based perovskite-type structure.

In addition, the laminated body was polished into a thin section, and ten crystal grains were then observed under a TEM to establish the presence or absence of Ca by EDX at the centers of the crystal grains. As a result, Ca was detected near the centers of the crystal grains while there is somewhat variability among the crystal grains. Thus, it has been confirmed that the main constituent of the crystal grains includes barium calcium titanate.

Next, a Cu paste containing glass frit was applied onto both end surfaces of the capacitor main body described above, and fired at a temperature of 800° C. in an $N_2$ atmosphere to form external electrodes electrically connected to the internal electrodes, thereby providing laminated ceramic capacitors according to respective samples.

The laminated ceramic capacitors thus obtained had outside dimensions of 2.0 mm in length, 1.2 mm in width, and 1.0 mm in thickness, and the dielectric ceramic layers interposed between the internal electrodes had a thickness of 1 μm. In addition, the number of effective dielectric ceramic layers was 400, and the area of the electrode opposed per dielectric ceramic layer was 1.8 mm².

(C) Characterization

Next, the laminated ceramic capacitors according to respective samples were evaluated as follows.

(1) Measurement of Crystal Grain Size

The laminated ceramic capacitor was fractured, and subjected to thermal etching at 1000° C. Thereafter, 200 crystal grains of the fractured surface were observed with the use of FE-SEM to calculate the equivalent circle diameters, and the D50 value was regarded as the crystal grain size of the laminated ceramic capacitor. The value is shown in Table 2.

(2) Measurement of Dielectric Constant

The electrostatic capacitance of the laminated ceramic capacitor was measured under the conditions of 1 Vrms and 1 kHz at 25° C. with the use of an automatic bridge measurement machine. The dielectric constant was calculated from the obtained measurement value. The value is shown in Table 2.

(3) Measurement of Lifetime Characteristics with High-Temperature Loading Test

A direct-current voltage of 30 V was applied to the laminated ceramic capacitor at 165° C. to observe the change in insulation resistance with time. When the insulation resistance value for each laminated ceramic capacitor had decreased to 0.1 MΩ or less, the capacitor was regarded as a failure. The time to failure was noted. The value is shown in Table 2.

TABLE 2

| Sample Number | Dielectric Constant | Crystal Grain Size [nm] | Dielectric Constant Crystal Grain Size | Time to Failure [h] |
|---|---|---|---|---|
| 1 | 3243 | 129 | 25.1 | 185 |
| 2 | 3668 | 204 | 18.0 | 61 |
| 3 | 3214 | 128 | 25.1 | 154 |
| 4 | 3103 | 120 | 25.9 | 193 |
| 5 | 2416 | 122 | 19.8 | 179 |
| 6 | 3594 | 199 | 18.1 | 56 |
| 7 | 3426 | 150 | 22.8 | 124 |
| 8 | 3381 | 141 | 24.0 | 140 |
| 9 | 3354 | 133 | 25.2 | 167 |

TABLE 2-continued

| Sample Number | Dielectric Constant | Crystal Grain Size [nm] | Dielectric Constant Crystal Grain Size | Time to Failure [h] |
|---|---|---|---|---|
| 10 | 3047 | 121 | 25.2 | 205 |
| 11 | 2612 | 131 | 19.9 | 224 |
| 12 | 2555 | 130 | 19.7 | 167 |
| 13 | 3154 | 126 | 25.0 | 160 |
| 14 | 3307 | 129 | 25.6 | 169 |
| 15 | 2618 | 134 | 19.5 | 190 |
| 16 | 2631 | 134 | 19.6 | 81 |
| 17 | 3179 | 126 | 25.2 | 174 |
| 18 | 3202 | 124 | 25.8 | 189 |
| 19 | 2640 | 133 | 19.8 | 157 |
| 20 | 3417 | 145 | 23.6 | 105 |
| 21 | 3404 | 128 | 26.6 | 152 |
| 22 | 3319 | 126 | 26.3 | 163 |
| 23 | 3142 | 119 | 26.4 | 170 |
| 24 | 3214 | 155 | 20.7 | 120 |
| 25 | 3193 | 127 | 25.1 | 153 |
| 26 | 3100 | 122 | 25.4 | 199 |
| 27 | 3055 | 122 | 25.0 | 231 |
| 28 | 3200 | 145 | 22.1 | 137 |
| 29 | 3180 | 124 | 25.6 | 150 |
| 30 | 3125 | 125 | 25.0 | 220 |
| 31 | 3078 | 120 | 25.7 | 208 |
| 32 | 3252 | 140 | 23.2 | 109 |
| 33 | 3187 | 126 | 25.3 | 157 |
| 34 | 3107 | 120 | 25.9 | 195 |
| 35 | 3085 | 123 | 25.1 | 176 |
| 36 | 3336 | 146 | 22.8 | 120 |
| 37 | 3242 | 125 | 25.9 | 154 |
| 38 | 3202 | 126 | 25.4 | 190 |
| 39 | 3103 | 124 | 25.0 | 217 |
| 40 | 3265 | 152 | 21.5 | 129 |
| 41 | 3250 | 127 | 25.6 | 156 |
| 42 | 3236 | 120 | 27.0 | 179 |
| 43 | 3111 | 122 | 25.5 | 207 |
| 44 | 3301 | 147 | 22.5 | 111 |
| 45 | 3334 | 125 | 26.7 | 152 |
| 46 | 3277 | 123 | 26.6 | 164 |
| 47 | 3204 | 117 | 27.4 | 159 |
| 48 | 3355 | 143 | 23.5 | 110 |
| 49 | 3301 | 130 | 25.4 | 158 |
| 50 | 3256 | 126 | 25.8 | 157 |
| 51 | 3199 | 126 | 25.4 | 145 |
| 52 | 3305 | 139 | 23.8 | 108 |
| 53 | 3341 | 126 | 26.5 | 158 |
| 54 | 3292 | 130 | 25.3 | 167 |
| 55 | 3241 | 129 | 25.1 | 156 |
| 56 | 3417 | 140 | 24.4 | 126 |
| 57 | 3330 | 124 | 26.9 | 151 |
| 58 | 3217 | 128 | 25.1 | 158 |
| 59 | 3215 | 125 | 25.7 | 161 |

The samples in which the Ca content x satisfied $0.03 \leq x \leq 0.15$, the Mg content satisfied 0.01 parts by mol or more and 0.09 parts by mol or less, the R content satisfied 2.5 parts by mol or more and 8.4 parts by mol or less, and the Zr content satisfied 0.05 parts by mol or more and 3.0 parts by mol or less achieved high dielectric constants and inhibited crystal growth, with high Dielectric Constant/Crystal Grain Size of 20 or more. As a result, the time to failure has been also increased in length to 100 h or longer.

Furthermore, when the R content is 5.7 parts by mol or more and 8.4 parts by mol or less, the Dielectric Constant/Crystal Grain Size was further increased to 25 or more, and the time to failure has been increased in length to 150 h or longer.

Example 2

(A) Preparation of Ceramic Raw Material

First, respective powders of high-purity $BaCO_3$, $CaCO_3$, and $TiO_2$ were prepared as starting raw materials of $(Ba_{1-x}Ca_x)TiO_3$ to serve as the main constituent, and blended so as to have the contents shown in Table 3, that is, the "Ca Content: x".

Next, the blended powder was subjected to wet mixing in a ball mill so as to be dispersed uniformly, and then subjected to drying to obtain an adjusted powder. Then, the adjusted powder obtained was subjected to calcination at a temperature of 1000° C. to 1200° C. to obtain a main constituent powder with an average grain size of 0.2 μm.

Respective powders of $MgCO_3$, $R_2O_3$, $ZrO_2$, MnO, $V_2O_5$, and $SiO_2$ were prepared as accessory constituents. It is to be noted that respective powders of $Y_2O_3$, $La_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, and $Yb_2O_3$ were prepared for the $R_2O_3$ powder.

Next, the respective powders of $MgCO_3$, $R_2O_3$, $ZrO_2$, MnO, $V_2O_5$, and $SiO_2$ were weighed so as to provide the contents of Mg, R, Zr, Mn, V, and Si in terms of parts by mol with respect to 100 parts by mol of Ti as shown in Table 3, and added to the above-described main constituent powder to obtain a mixed powder.

TABLE 3

| Sample Number | x | Mg | Type of R | R Content | Zr Content | Mn Content | V Content | Si Content |
|---|---|---|---|---|---|---|---|---|
| 60 | 0.08 | 0.05 | Dy | 7.0 | 0.5 | 0.08 | 0.1 | 1.5 |
| 61 | 0.08 | 0.05 | Dy | 7.0 | 0.5 | 0.1 | 0.1 | 1.5 |
| 62 | 0.08 | 0.05 | Dy | 7.0 | 0.5 | 0.5 | 0.1 | 1.5 |
| 63 | 0.08 | 0.05 | Dy | 7.0 | 0.5 | 1 | 0.1 | 1.5 |
| 64 | 0.08 | 0.05 | Dy | 7.0 | 0.5 | 1.15 | 0.1 | 1.5 |
| 65 | 0.08 | 0.05 | Dy | 7.0 | 0.5 | 0.5 | 0.03 | 1.5 |
| 66 | 0.08 | 0.05 | Dy | 7.0 | 0.5 | 0.5 | 0.05 | 1.5 |
| 67 | 0.08 | 0.05 | Dy | 7.0 | 0.5 | 0.5 | 0.5 | 1.5 |
| 68 | 0.08 | 0.05 | Dy | 7.0 | 0.5 | 0.5 | 0.7 | 1.5 |
| 69 | 0.08 | 0.05 | Dy | 7.0 | 0.5 | 0.5 | 0.1 | 0.3 |
| 70 | 0.08 | 0.05 | Dy | 7.0 | 0.5 | 0.5 | 0.1 | 0.5 |
| 71 | 0.08 | 0.05 | Dy | 7.0 | 0.5 | 0.5 | 0.1 | 2.5 |
| 72 | 0.08 | 0.05 | Dy | 7.0 | 0.5 | 0.5 | 0.1 | 2.7 |

(B) Preparation of Laminated Ceramic Capacitor

The mixed powder with an organic solvent and a dispersant added thereto was subjected to wet mixing in a ball mill for homogeneous dispersion. Further, mixing was carried out with the addition of a polyvinyl butyral based binder and a plasticizer to obtain ceramic slurry.

Then, this ceramic slurry was subjected to sheet forming in accordance with a lip method to obtain ceramic green sheets in a rectangular shape with a thickness of 1.3 μm.

The ceramic green sheet was sampled, and subjected to composition analysis on the inorganic constituents by ICP to confirm that the blending composition shown in Table 1 was substantially maintained. It is to be noted that the incorporation from the YSZ balls used for the mixing increased the content of Zr by a minute amount on the order of 0.03 parts by mol.

Next, the ceramic green sheets were used to obtain a laminated body in accordance with the same production process as in Example 1.

The laminated body was dissolved, and subjected to an ICP analysis to confirm that the composition of the ceramic green sheet was substantially maintained, except for Ni as an internal electrode constituent.

Next, this laminated body was subjected to an XRD structural analysis to reveal that the main constituent had a barium titanate based perovskite-type structure.

In addition, this laminated body was polished into a thin section, and ten crystal grains were then observed under a TEM to establish the presence or absence of Ca by EDX at the centers of the crystal grains. As a result, Ca was detected at the centers of the crystal grains while there is somewhat variability among the crystal grains. Thus, it has been confirmed that the main constituent of the crystal grains includes barium calcium titanate.

Next, external electrodes were formed on both end surfaces of the capacitor main body in accordance with the same production process as in Example 1 to obtain laminated ceramic capacitors according to respective samples.

The laminated ceramic capacitors thus obtained had outside dimensions of 2.0 mm in length, 1.2 mm in width, and 1.0 mm in thickness, and the dielectric ceramic layers interposed between the internal electrodes had a thickness of 1 μm. In addition, the number of effective dielectric ceramic layers was 400, and the area of the electrode opposed per dielectric ceramic layer was 1.8 mm$^2$.

(C) Characterization

Next, the laminated ceramic capacitors according to respective samples were subjected to: (1) Measurement of Crystal Grain Size; (2) Measurement of Dielectric Constant; and (3) Measurement of Lifetime Characteristics with High-Temperature Loading Test by the same methods as in Example 1. The results are shown in Table 4. In addition, the following evaluations were further made.

(4) Temperature Rate of Change in Electrostatic Capacitance

The electrostatic capacitance was measured while changing the temperature in the range from −55° C. to +125° C., and with the use of the electrostatic capacitance ($C_{25}$) at 25° C. as a reference, the rate of change ($\Delta C_{TC}$) for the electrostatic capacitance value ($C_{TC}$) with the maximum rate of change was calculated from the formula of $\Delta C_{TC}=((C_{TC}-C_{25})/C_{25})\times 100(\%)$. The results are shown in Table 4.

(5) Specific Resistance

With the use of an insulation resistance meter, a direct-current voltage of 10 V was applied at 25° C. for 120 seconds, and the specific resistance log (ρ/Ω·m) was calculated from the obtained insulation resistance value. The results are shown in Table 4.

TABLE 4

| Sample Number | Dielectric Constant | Crystal Grain Size [nm] | Dielectric Constant Crystal Grain Size | Time to Failure [h] | Temperature Characteristics of Electrostatic Capacitance (%) | Specific Resistance log (ρ/Ω·m) |
|---|---|---|---|---|---|---|
| 60 | 3261 | 128 | 25.5 | 180 | −17.1 | 10.7 |
| 61 | 3250 | 126 | 25.8 | 175 | −14.3 | 10.7 |
| 62 | 3294 | 131 | 25.1 | 183 | −12.8 | 10.6 |
| 63 | 3199 | 126 | 25.4 | 168 | −12.0 | 10.5 |
| 64 | 3215 | 128 | 25.1 | 165 | −11.8 | 9.8 |
| 65 | 3247 | 125 | 26.0 | 184 | −16.9 | 10.7 |
| 66 | 3301 | 128 | 25.8 | 186 | −14.0 | 10.6 |
| 67 | 3259 | 130 | 25.1 | 176 | −13.1 | 10.4 |
| 68 | 3297 | 129 | 25.6 | 180 | −12.4 | 9.5 |
| 69 | 3268 | 127 | 25.7 | 178 | −17.0 | 10.7 |
| 70 | 3266 | 124 | 26.3 | 185 | −13.1 | 10.6 |
| 71 | 3251 | 129 | 25.2 | 164 | −13.7 | 10.5 |
| 72 | 3260 | 130 | 25.1 | 167 | −17.2 | 10.7 |

Samples 61 to 63, 66, 67, 70, and 71 in which the Mn content was 0.1 parts by mol or more and 1.0 part by mol or less, the V content was 0.05 parts by mol or more and 0.5 parts by mol or less, and the Si content was 0.5 parts by mol or more and 2.5 pats by mol or less achieved high insulation properties and favorable temperature characteristics of electrostatic capacitance.

DESCRIPTION OF REFERENCE SYMBOLS

1 laminated ceramic capacitor
2 dielectric ceramic layer
3,4 internal electrode
5 laminated body
6,7 external electrode

The invention claimed is:
1. A laminated ceramic capacitor comprising:
   a laminated body comprising dielectric ceramic layers including crystal grains and crystal grain boundaries and internal electrode layers; and
   external electrodes disposed on a surface of the laminated body electrically connecting to internal electrode layers, wherein the laminated body has a composition comprising, as its main constituent, a perovskite-type compound including Ba, Ca, and Ti, and further containing Mg, R (in which R is at least one member selected from the group consisting of Y, La, Sm, Eu, Gd, Tb, Dy, Ho, Er, Tm, and Yb), and Zr, and the contents of the respective elements in terms of parts by mol are Ca: 3 parts by mol or more and 15 parts by mol or less,
Mg: 0.01 parts by mol or more and 0.09 parts by mol or less,
R: 2.5 parts by mol or more and 8.4 parts by mol or less, and
Zr: 0.05 parts by mol or more and 3.0 parts by mol or less with respect to 100 parts by mol of Ti, and there is Ca at least at the centers of crystal grains.

2. A laminated ceramic capacitor according to claim 1, wherein said contents of the respective elements in terms of parts by mol are when the laminated body is dissolved in a solvent therefor.

3. The laminated ceramic capacitor according to claim 2, wherein the R content is 5.7 parts by mol or more and 8.4 parts by mol or less with respect to 100 parts by mol of Ti.

4. The laminated ceramic capacitor according to claim 3, wherein the Mg content is at least 0.05 parts by mol and the Zr content is 0.5 parts by mol or more and 2.9 parts by mol or less, with respect to 100 parts by mol of Ti.

5. The laminated ceramic capacitor according to claim 4, further containing Mn, V, and Si, wherein the contents of the respective elements in terms of parts by mol are Mn: 0.1 parts by mol or more and 1.0 part by mol or less,
V: 0.05 parts by mol or more and 0.5 parts by mol or less, and
Si: 0.5 parts by mol or more and 2.5 parts by mol or less with respect to 100 parts by mol of Ti.

6. The laminated ceramic capacitor according to claim 1, wherein the R content is 5.7 parts by mol or more and 8.4 parts by mol or less with respect to 100 parts by mol of Ti.

7. The laminated ceramic capacitor according to claim 6, further containing Mn, V, and Si, wherein the Contents of the respective elements in terms of parts by mol are Mn: 0.1 parts by mol or more and 1.0 part by mol or less,
V: 0.05 parts by mol or more and 0.5 parts by mol or less, and
Si: 0.5 parts by mol or more and 2.5 parts by mol or less with respect to 100 parts by mol of Ti.

8. The laminated ceramic capacitor according to claim 1, further containing Mn, V, and Si, wherein the contents of the respective elements in terms of parts by mol are Mn: 0.1 parts by mol or more and 1.0 part by mol or less,
V: 0.05 parts by mol or more and 0.5 parts by mol or less, and
Si: 0.5 parts by mol or more and 2.5 parts by mol or less with respect to 100 parts by mol of Ti.

9. The laminated ceramic capacitor according to claim 1, wherein the Mg content is at least 0.05 parts by mol and the Zr content is 0.5 parts by mol or more and 2.9 parts by mol or less, with respect to 100 parts by mol of Ti.

10. A method for producing a laminated ceramic capacitor comprising providing a slurry comprising a main constituent powder containing, as its main constituent, a perovskite-type compound including Ba, Ca, and Ti, a Mg compound, a R compound in which R is at least one member selected from the group consisting of Y, La, Sm, Eu, Gd, Tb, Dy, Ho, Er, Tm, and Yb, and a Zr compound;

obtaining ceramic green sheets from the ceramic slurry;
stacking ceramic green sheets and internal electrode layers to obtain an unfired laminated body; and
firing the unfired laminated body to obtain a laminated body, wherein the contents of the respective elements in terms of parts by mol are Ca: 3 parts by mol or more and 15 parts by mol or less,
Mg: 0.01 parts by mol or more and 0.09 parts by mol or less,
R: 2.5 parts by mol or more and 8.4 parts by mol or less, and
Zr: 0.05 parts by mol or more and 3.0 parts by mol or less with respect to 100 parts by mol of Ti.

11. The method for producing a laminated ceramic capacitor according to claim 10, wherein the R content in the slurry is 5.7 parts by mol or more and 8.4 parts by mol or less with respect to 100 parts by mol of Ti.

12. The method of producing a laminated ceramic capacitor according to claim 11, wherein the Mg content in the slurry is at least 0.05 parts by mol and the Zr content in the slurry is 0.5 parts by mol or more and 2.9 parts by mol or less, with respect to 100 parts by mol of Ti.

13. The method for producing a laminated ceramic capacitor according to claim 12, wherein the slurry further contains Mn, V, and Si, wherein the contents of the respective elements in terms of parts by mol are Mn: 0.1 parts by mol or more and 1.0 part by mol or less,
V: 0.05 parts by mol or more and 0.5 parts by mol or less, and
Si: 0.5 parts by mol or more and 2.5 parts by mol or less with respect to 100 parts by mol of Ti.

14. The method for producing a laminated ceramic capacitor according to claim 13, wherein the slurry further contains Mn, V, and Si, wherein the contents of the respective elements in terms of parts by mol are Mn: 0.1 parts by mol or more and 1.0 part by mol or less,
V: 0.05 parts by mol or more and 0.5 parts by mol or less, and
Si: 0.5 parts by mol or more and 2.5 parts by mol or less with respect to 100 parts by mol of Ti.

15. The method for producing a laminated ceramic capacitor according to claim 12, wherein the slurry further contains Mn, V, and Si, wherein the contents of the respective elements in terms of parts by mol are Mn: 0.1 parts by mol or more and 1.0 part by mol or less,
V: 0.05 parts by mol or more and 0.5 parts by mol or less, and
Si: 0.5 parts by mol or more and 2.5 parts by mol or less with respect to 100 parts by mol of Ti.

16. The method for producing a laminated ceramic capacitor according to claim 11, wherein the slurry further contains Mn, V, and Si, wherein the contents of the respective elements in terms of parts by mol are Mn: 0.1 parts by mol or more and 1.0 part by mol or less,
V: 0.05 parts by mol or more and 0.5 parts by mol or less, and
Si: 0.5 parts by mol or more and 2.5 parts by mol or less with respect to 100 parts by mol of Ti.

17. The method for producing a laminated ceramic capacitor according to claim 10, wherein the slurry further contains Mn, V, and Si, wherein the contents of the respective elements in terms of parts by mol are Mn: 0.1 parts by mol or more and 1.0 part by mol or less,
V: 0.05 parts by mol or more and 0.5 parts by mol or less, and
Si: 0.5 parts by mol or more and 2.5 parts by mol or less
with respect to 100 parts by mol of Ti.

* * * * *